United States Patent
Dimoski et al.

(10) Patent No.: US 10,808,594 B2
(45) Date of Patent: Oct. 20, 2020

(54) GENERALIZED COLD START EMISSIONS REDUCTION STRATEGY

(71) Applicant: GM Global Technology Operations LLC, Detroit, MI (US)

(72) Inventors: Daniel S. Dimoski, Royal Oak, MI (US); Brian P. Hannon, Jr., Highland, MI (US); Vijay Ramappan, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 132 days.

(21) Appl. No.: 15/958,242

(22) Filed: Apr. 20, 2018

(65) Prior Publication Data

US 2019/0323407 A1   Oct. 24, 2019

(51) Int. Cl.
| | |
|---|---|
| *F01N 11/00* | (2006.01) |
| *F02D 41/02* | (2006.01) |
| *B01D 53/94* | (2006.01) |
| *F02D 41/24* | (2006.01) |

(52) U.S. Cl.
CPC ........ *F01N 11/002* (2013.01); *B01D 53/9495* (2013.01); *F02D 41/0245* (2013.01); *F01N 2550/02* (2013.01); *F02D 41/2406* (2013.01)

(58) Field of Classification Search
CPC .............. B01D 53/9495; F01N 11/002; F01N 2550/02; F02D 41/0245; F02D 41/2406
See application file for complete search history.

(56) References Cited

U.S. PATENT DOCUMENTS

| | | | | |
|---|---|---|---|---|
| 7,766,542 | B2* | 8/2010 | Cunningham | F01N 3/0842 374/104 |
| 8,201,443 | B2* | 6/2012 | Wang | G01K 13/02 73/114.75 |
| 2009/0151339 | A1* | 6/2009 | Doring | B01D 53/9431 60/295 |
| 2010/0024392 | A1* | 2/2010 | Mueller | F02D 41/0245 60/274 |
| 2015/0275792 | A1* | 10/2015 | Genslak | F02D 41/1445 60/274 |
| 2017/0284324 | A1* | 10/2017 | Eichhorn | F02D 41/405 |

FOREIGN PATENT DOCUMENTS

JP         08158928 A  *  6/1996

* cited by examiner

*Primary Examiner* — Matthew T Largi

(57) ABSTRACT

A system providing an approach for catalytic converter warmup mode is applicable to multiple vehicle applications including hybrid vehicles. The system determines exhaust enthalpy during conditions including transient engine speed and transient engine load for a catalytic converter receiving exhaust output from an engine. Multiple exhaust parameter measurement devices each measure exhaust conditions entering the catalytic converter. A processor receives output from each of the exhaust parameter measurement devices and continuously calculates an enthalpy of the catalytic converter. The calculated enthalpy of the catalytic converter is repeatedly compared to a predetermined enthalpy threshold required to achieve catalytic light-off saved in a memory.

15 Claims, 4 Drawing Sheets

GENERALIZED COLD START EMISSIONS REDUCTION STRATEGY

INTRODUCTION

The present disclosure relates to automobile vehicle engine cold start emission reduction and catalyst operation.

Vehicle cold start emission reduction strategy is normally implemented during stable engine speed and load conditions. A predetermined time is normally allowed for catalyst warm-up of a catalytic converter before emission strategies are executed. An elevated engine idle employing one or both of a spark retard together with engine rpm elevation is normally performed for a predetermined time period, for example approximately 10 to 20 seconds, after which it is assumed catalytic converter light-off has occurred and catalytic converter oxidation and reduction processes are occurring.

Newer propulsion technologies may necessitate execution of emission reduction regardless of engine state, which may therefore require catalyst warm-up be executed during transient engine speed and load. Under these conditions, the predetermined time period for elevated engine idle is not available or is not achieved, therefore the set target for both spark retard and accumulated engine rpm has not been achieved. A new approach for managing cold start emissions reduction during conditions of transient engine speed and load is therefore required.

Thus, while current vehicle cold start emission reduction strategies achieve their intended purpose, there is a need for a new and improved system and method for implementing emission cold start strategy.

SUMMARY

According to several aspects, a system for determining catalytic light-off conditions during transient engine speed and transient engine load includes a catalytic converter receiving exhaust output from an engine. At least one exhaust parameter measurement device measures at least one parameter of the exhaust entering the catalytic converter. A processor receives output from the at least one exhaust parameter measurement device and continuously calculates an enthalpy of the catalytic converter. The calculated enthalpy of the catalytic converter is repeatedly compared to a predetermined enthalpy threshold required to achieve catalytic light-off saved in a memory.

In another aspect of the present disclosure, a calculation block receives inputs including an exhaust input temperature, a mass air flow, a mass fuel flow, and a catalytic converter warmup mode state for calculating the enthalpy of the catalytic converter.

In another aspect of the present disclosure, in the calculation block, the catalytic converter warmup mode state being True is determined prior to initiating calculation of the enthalpy of the catalytic converter, the catalytic converter warmup mode state being True identifies the catalytic converter is at a temperature below that required for catalytic light-off.

In another aspect of the present disclosure, a cumulative mass flow past the catalytic converter is calculated by the processor; and in a comparative block a determination is made if a) the calculated enthalpy of the catalytic converter is greater than the predetermined enthalpy threshold, and b) if the cumulative mass flow is less than a predetermined cumulative mass flow threshold.

In another aspect of the present disclosure, if an output from the comparative block for (a) and (b) is affirmative, a diagnostic pass signal is generated.

In another aspect of the present disclosure, if an output from the comparative block for (a) and (b) is negative, a diagnostic fail signal is generated.

In another aspect of the present disclosure, a cumulative mass flow past the catalytic converter is calculated by the processor; and in a determination block it is determined that the catalytic converter warmup mode state is False and if the cumulative mass flow is greater than a predetermined minimum threshold.

In another aspect of the present disclosure, if an output from the determination block is positive, a diagnostic test indeterminate signal is generated.

In another aspect of the present disclosure, a catalytic converter warmup mode enabled status is determined in a determination block, and if an output from the determination block is positive indicating the catalytic converter warmup mode is enabled, a request for a torque reserve is made to increase an exhaust temperature; and the torque reserve is computed and integrated following the request for the torque reserve in a first computation block.

In another aspect of the present disclosure, a result from the computation block is entered as a first variable in a comparison block; and a second computation block provides a second variable defining an energy threshold necessary to achieve catalyst light-off to the comparison block.

In another aspect of the present disclosure, the energy threshold required to achieve catalyst light-off defining the second variable is integrated as an exhaust flow accumulated value; and in the comparison block the second variable is compared to the first variable to determine if the second variable is greater than the first variable, and if an output from the comparison block is negative, the torque reserve is sufficient to meet the enthalpy threshold required for catalyst light-off.

In another aspect of the present disclosure, the at least one exhaust parameter measurement device defines each of a temperature sensor, a mass air flow sensor, and a mass fuel flow sensor.

According to several aspects, a method for determining catalytic light-off conditions of a catalytic converter during transient engine speed and transient engine load includes: measuring exhaust conditions entering the catalytic converter using an exhaust parameter measurement device; forwarding an output from the exhaust parameter measurement device to a processor; calculating an enthalpy of the catalytic converter in the processor; and repeatedly comparing the enthalpy of the catalytic converter to a predetermined enthalpy threshold required to achieve catalytic light-off saved in a memory.

In another aspect of the present disclosure, the method includes: confirming the catalytic converter is at or below a required temperature for catalytic light-off; and performing the calculating step in a calculation block, the calculation block receiving inputs including an exhaust temperature, a mass air flow, a mass fuel flow, and a catalytic converter warmup mode.

In another aspect of the present disclosure, the method includes: determining if the calculated enthalpy of the catalytic converter is greater than the predetermined enthalpy threshold.

In another aspect of the present disclosure, the method includes: determining that a catalytic converter warmup mode is enabled; and requesting a torque reserve to increase an exhaust temperature.

In another aspect of the present disclosure, the method includes: identifying a first variable defining an energy threshold necessary to achieve catalyst light-off and entering the first variable into a comparison block; entering a result from the computing step into the comparison block as a second variable; and comparing the first variable to the second variable to determine if the second variable is greater than the first variable, and if the comparison is negative, the torque reserve is deemed sufficient to meet an enthalpy threshold required for catalyst light-off.

According to several aspects, a method for determining catalytic light-off conditions of a catalytic converter during transient engine speed and transient engine load includes: measuring exhaust conditions entering the catalytic converter using at least one exhaust parameter measurement device; forwarding an output from the at least one exhaust parameter measurement device to a processor; continuously calculating an enthalpy of the catalytic converter in the processor; repeatedly comparing the calculated enthalpy of the catalytic converter to a predetermined enthalpy threshold required to achieve catalyst light-off saved in a memory; and calculating a cumulative mass flow past the catalytic converter.

In another aspect of the present disclosure, the method includes: calculating a cumulative mass flow past the catalytic converter; and determining if: a) the enthalpy of the catalytic converter is greater than the predetermined enthalpy threshold, and b) if the cumulative mass flow is less than a predetermined cumulative mass flow threshold.

In another aspect of the present disclosure, the method includes: requesting a torque reserve to increase an exhaust temperature; and computing and integrating the torque reserve.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
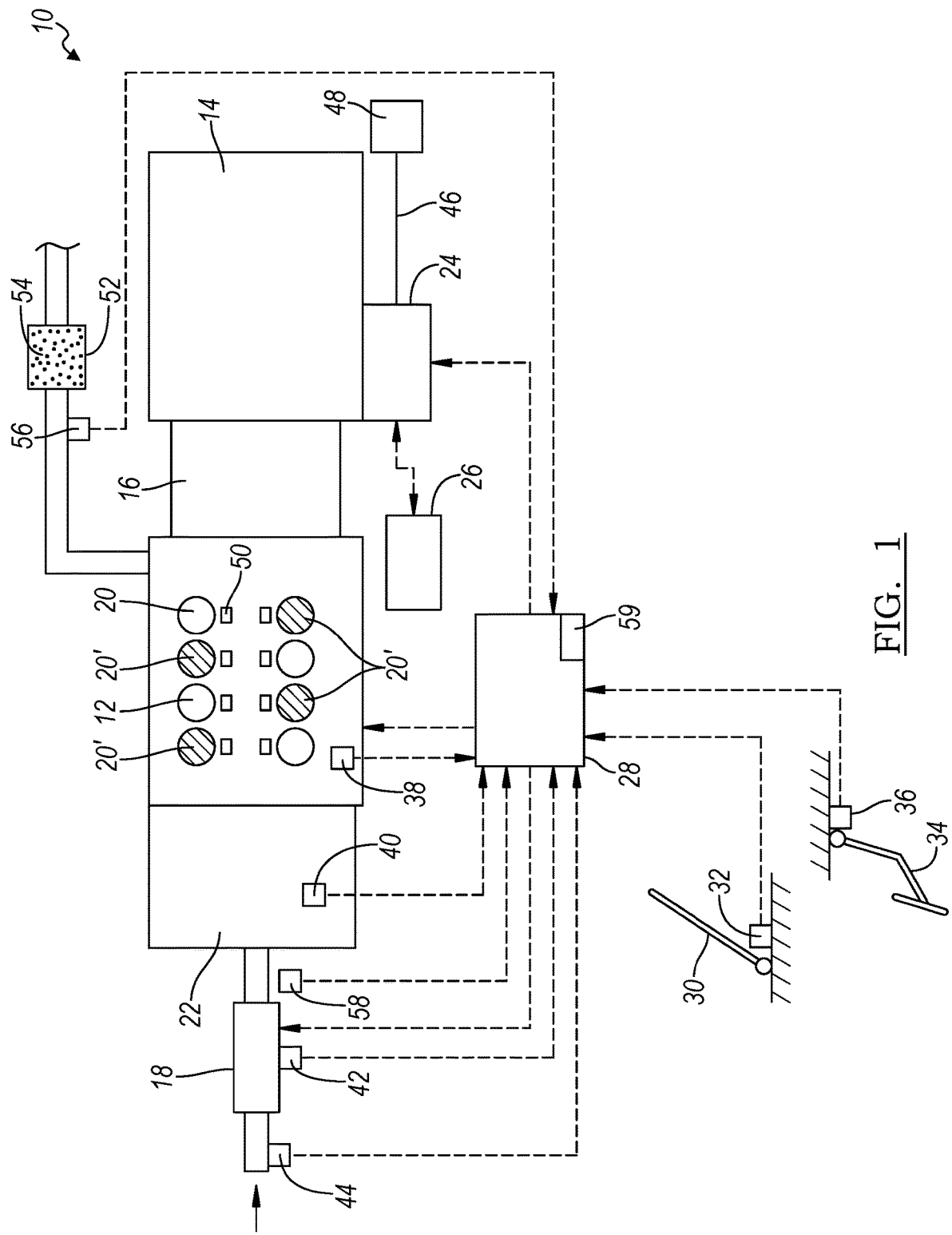
FIG. 1 is a schematic illustration of a vehicle powertrain and electrical system to accomplish a cold start emissions reduction strategy in accordance with one aspect of the present disclosure.

The following description of one aspect is merely exemplary in nature and is in no way intended to limit the invention, its application, or uses. For purposes of clarity, the same reference numbers will be used in the drawings to identify similar elements. As used herein, activated refers to operation using all of the engine cylinders. Deactivated refers to operation using less than all of the cylinders of the engine (one or more cylinders not active). As used herein, the term processor refers to an application specific integrated circuit (ASIC), an electronic circuit, a module (shared, dedicated, or group) and a memory that together execute one or more software or firmware programs, a combinational logic circuit, or other suitable components that provide the described functionality.

Referring now to FIG. 1, a vehicle 10 may be any type of automobile vehicle including internal combustion engine vehicles and hybrid vehicles, and includes an engine 12 that drives a transmission 14. The transmission 14 is either an automatic or a manual transmission that is driven by the engine 12 through a corresponding torque converter or clutch 16. Air flows into the engine 12 through a throttle 18. The engine 12 includes N cylinders 20. One or more of the cylinders 20 are selectively deactivated during engine operation. Although FIG. 1 depicts eight cylinders (N=8), it should be appreciated that the engine 12 may include additional or fewer cylinders 20. For example, engines having 4, 5, 6, 8, 10, 12 and 16 cylinders are contemplated. Air flows into the engine 12 through an intake manifold 22 and is combusted with fuel in the cylinders 20.

According to several aspects if the vehicle 10 is a hybrid vehicle, the vehicle 10 further includes an electric machine 24 and a battery 26. The electric machine 24 is operable in each of a motor mode and a generator mode. In the motor mode, the electric machine 24 is powered by the battery 26 and drives the transmission 14. In the generator mode, the electric machine 24 is driven by the transmission 14 and generates electrical energy that is used to charge the battery 26. It should also be evident the battery 26 can power other vehicle accessories in addition to the electric machine 24.

A controller 28 communicates with the engine 12, the electric machine 24 and receives various inputs from exhaust parameter measurement devices such as sensors as discussed herein. A vehicle operator manipulates an accelerator pedal 30 to regulate the throttle 18. More particularly, a pedal position sensor 32 generates a pedal position signal that is communicated to the controller 28. The controller 28 generates a throttle control signal based on the pedal position signal. A throttle actuator (not shown) adjusts the throttle 18 based on the throttle control signal to regulate air flow into the engine 12.

The vehicle operator also manipulates a brake pedal 34 to regulate vehicle braking. As the brake pedal 34 is actuated, a brake position sensor 36 generates a brake pedal position signal that is communicated to the controller 28. The controller 28 generates a brake control signal based on the brake pedal position signal. A brake system (not shown) adjusts vehicle braking based on the brake control signal to regulate vehicle speed. In addition to the pedal position sensor 32 and the brake position sensor 36, an engine speed sensor 38 generates a signal based on engine speed. An intake manifold absolute pressure (MAP) sensor 40 generates a signal based on a pressure of the intake manifold 22. A throttle position sensor (TPS) 42 generates a signal based on throttle position. A mass air flow sensor (MAF) 44 generates a signal based on air flow into the throttle 18.

When the vehicle load requirements can be met using torque generated by less than all of the cylinders 20, the controller 28 transitions the engine 12 to the deactivated mode. In an exemplary embodiment, N/2 cylinders 20' are deactivated, although one or more cylinders 20' may be deactivated. Upon deactivation of the selected cylinders 20', the controller 28 increases the power output of the remaining cylinders 20 by adjusting the position of the throttle 18. The engine load is determined based on the MAP, MAF, RPM, and other inputs. For example, if an engine vacuum is above a threshold level for a given RPM, the engine load can be provided by less than all cylinders and the engine 12 is operated in the deactivated mode. If the vacuum is below a second threshold level for the given RPM, the engine load cannot be provided by less than all of the cylinders, and the engine 12 is operated in the activated mode.

The controller 28 provides engine speed control to adapt the engine output torque through intake air/fuel and spark timing controls in order to maintain a target engine speed. The controller 28 provides an electronic spark timing (EST) signal output via a line 46 to an ignition controller 48. The ignition controller 48 responds to the EST signal to provide timed output of drive signals to spark plugs 50 for combusting the fuel charge in the engine cylinders 20. The EST signal may also provide spark timing signals over a wide range of timing. Normally, it is desirable that spark timing occur before piston top dead center and, with increasing engine speed it is typical to further advance spark timing.

It is also known to those skilled in the art to retard spark timing to after-top-dead center. Spark timing may be retarded for example to quickly limit engine output torque or during engine cold starts to increase exhaust gas temperature, in essence trading engine output torque for heat. The exhaust from the engine 12 is discharged through at least one catalytic converter 52, having a catalyst 54 which is required to reach a predetermined temperature (defining "catalyst light-off") prior to optimally performing its oxidation and reduction reactions. Spark timing may be retarded during engine cold starts to more quickly increase exhaust gas temperature, and therefore to raise the temperature of the catalyst 54 as quickly as possible, thereby more quickly achieving fuel emissions standards. The predetermined temperature defining catalyst light-off and conditions defining a total enthalpy value also defining catalyst light-off may be saved in a memory 59 of the controller 28.

As a further method to raise the temperature of the catalyst 54 during engine cold starts, an "elevated idle" may be performed, wherein the controller 28 signals for a temporarily increased engine idle speed above the normal engine idle speed. The elevated idle may extend for a period of approximately 10 to 40 seconds after engine start. A set target is used to control engine rpm and spark timing or retard during elevated idle operation.

During certain operational times the full period to perform elevated idle may not be available. For example, if the vehicle accelerates using the electric machine 24 powered by the battery 26 to drive the transmission 14, but there is insufficient torque to meet the torque demand, an engine start and torque output may be required before the catalyst 54 can reach the minimum required temperature for catalyst light-off. Under such conditions, it is desirable to continue to achieve emission standards while the engine speed comes up to meet torque demand. To help determine how such operations as elevated idle are effecting catalyst light-off, one or more exhaust temperature sensors 56 may be used, which can be positioned either upstream or downstream or both upstream and downstream of the catalytic converter 52. A mass fuel flow sensor 58 can also be provided.

Referring to FIG. 2 and again to FIG. 1, according to several aspects, exhaust enthalpy during conditions including transient engine speed and transient engine load are used as an input in a diagnostic method defining a parameter to control engine cold start emission reduction mode. The determination of an exhaust enthalpy to identify when catalytic light-off occurs provides an alternative approach to determining exhaust measurement deviations during a prescribed steady state engine operating condition such as during elevated idle when the steady state operating condition may not be available. Exhaust enthalpy can be determined by catalytic converter input or output temperature, using for example the exhaust temperature sensor 56. With continuing reference to FIG. 1, one or more temperature sensors, with only a single exhaust temperature sensor 56 shown as an example, are located upstream of the catalytic converter(s) 52 which are used to identify exhaust temperatures. Additional temperature sensors (not shown) may be positioned downstream of each catalytic converter 52.

Exhaust enthalpy may also be determined by a summation of the energy input to the catalytic converters 52. In this approach, exhaust enthalpy determined as an overall energy input to the catalytic converters 52 is calculated using the output from sensors such as the temperature sensor 56, the mass air flow sensor (MAF) 44 and the mass fuel flow sensor 58 described in reference to FIG. 1.

According to several aspects, in an enthalpy summation algorithm 60, an exhaust temperature 62, a mass air flow 64, a mass fuel flow 66, and a catalytic converter warmup mode state 68 are each inputs to a calculation block 70. In the calculation block 70, it is initially identified if the catalytic converter warmup mode state is True 72, which identifies the catalytic converter is at a temperature below that required for catalytic light-off, for example the catalytic converter 52 is at an ambient temperature. If the catalytic converter warmup mode state is True 72, an exhaust enthalpy 74 is calculated, and a cumulative mass flow 76 past the catalytic converter 52 for the exhaust enthalpy 74 is also calculated. These values may each be integrated in determining if the energy and temperature conditions for catalytic converter light-off have been achieved.

The exhaust enthalpy 74 determined in the calculation block 70 can be calculated using integral equations (1) and (2) below:

$$Q_{In\ Flow} = \int \dot{m}^* C_p(T)^* T_{in} dt \qquad \text{Equation (1):}$$

$$m_{In\ Flow} = \int (\dot{m}_{air} + \dot{m}_{fuel}) dt \qquad \text{Equation (2):}$$

Where $Q_{In\ Flow}$ is the cumulative energy flow into the catalytic converter 52, and $m_{In\ Flow}$ is the cumulative mass flow going past the catalytic converter 52.

As a diagnostic tool, in a following comparative block 78 it is determined if a) the calculated exhaust enthalpy 74 is greater than a predetermined enthalpy threshold, AND b) if the cumulative mass flow 76 is less than a predetermined cumulative mass flow threshold. If an output 82 from the comparative block 78 for items (a) and (b) above is affirmative, a diagnostic pass signal 84 is generated. If an output 86 from the comparative block 78 is negative, in a cumulative block 88 it is determined if the cumulative mass flow 76 is less than a predetermined mass flow threshold. If an output 92 from the cumulative block 88 is negative, a diagnostic fail signal 94 is generated.

If an output 96 from the cumulative block 88 is positive, in a determination block 98 it is determined if the catalytic converter warmup mode state 68 is False 100 and if the cumulative mass flow 76 is greater than a predetermined minimum threshold 102. If an output 104 from the determination block 98 is negative, the program returns to the calculation block 70. If an output 106 from the determination block 98 is positive, the diagnostic test is deemed indeterminate, and a diagnostic test indeterminate signal 108 is generated. Enthalpy into the catalytic converter 52 is measured until a predetermined energy level is achieved to assume catalytic converter light-off is achieved. The diagnostic compares both energy and mass flows. When energy flow is greater than mass flow, catalytic light-off can occur and the diagnostic pass is identified. If mass flow is greater than energy flow, the diagnostic fails and is repeated. The diagnostic is not time dependent, and continues unless a "fault pending" state is identified defining the indeterminate outcome. The indeterminate outcome may result for example when an engine start occurs, but the engine is shut off before a time period sufficient to achieve catalytic light-off has been reached.

Figure 2:
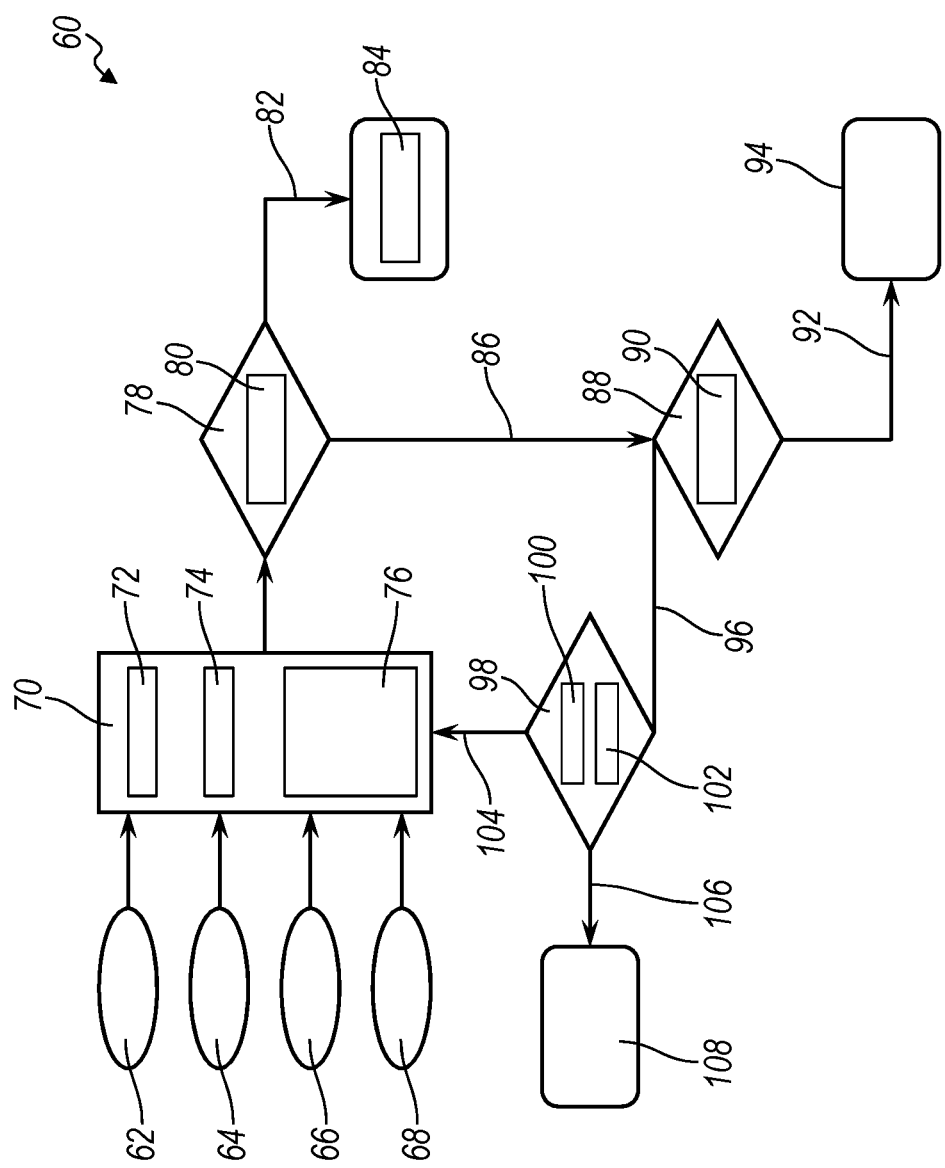
FIG. 2 is a flow diagram for catalytic converter warmup mode using exhaust enthalpy and cumulative exhaust mass flow threshold as a catalyst light-off diagnostic.

Referring to FIG. 3 and again to FIGS. 1 and 2, according to other aspects, a method for determining exhaust enthalpy integrates a torque reserve as a parameter for an exit strategy from catalyst warmup mode. Torque reserve is defined as a crankshaft torque potential value. A torque reserve may be available due to retarded spark timing during an engine cold start mode which delays combustion and therefore creates a difference between the potential value of torque and an actual delivered torque. Values of torque reserve are integrated over time, and upon reaching a threshold based on an exhaust flow accumulated value, the torque reserve value is used as a basis to conclude if the necessary increased exhaust enthalpy has been reached to achieve catalytic light-off.

According to a torque reserve enthalpy integration algorithm 110, a catalytic converter warmup mode status 112 is determined at a determination block 114. If an output 116 from the determination block 114 is positive, indicating the catalytic converter warmup mode is enabled, in a request step 118 a request for torque reserve is made to increase an exhaust temperature. Following the request for torque reserve 118, in a computation block 120 a torque reserve is computed and integrated. The result from the computation block 120 is entered as a first variable into a comparison block 122. A second variable, defining an energy threshold necessary to achieve catalyst light-off, is obtained from a second computation block 124 and entered into the comparison block 122. As noted above, the energy threshold necessary to achieve catalyst light-off used as the second variable is integrated as an exhaust flow accumulated value. In the comparison block 122, the second variable defining the energy threshold necessary to achieve catalyst light-off is compared to the first variable obtained from the computation block 120 to determine if the second variable is greater than the first variable. If an output 126 from the comparison block 122 is negative, the torque reserve available is sufficient to meet the energy threshold required for catalyst light-off, and the algorithm returns to and repeats the request step 118.

If an output 128 from the comparison block 122 is positive, the torque reserve available is insufficient to meet the energy threshold required for catalyst light-off. The algorithm provides a response gate 130 which receives the output 128 from the comparison block 122. In addition, if an output from the determination block 114 is negative, indicating the catalytic converter warmup mode is not enabled, the negative response from the determination block 114 is also forwarded to the response gate 130. Any response received by the negative response gate 130 results in a flag 132 indicating torque reserve should not be requested, and the algorithm ends at a step 134.

Figure 3:
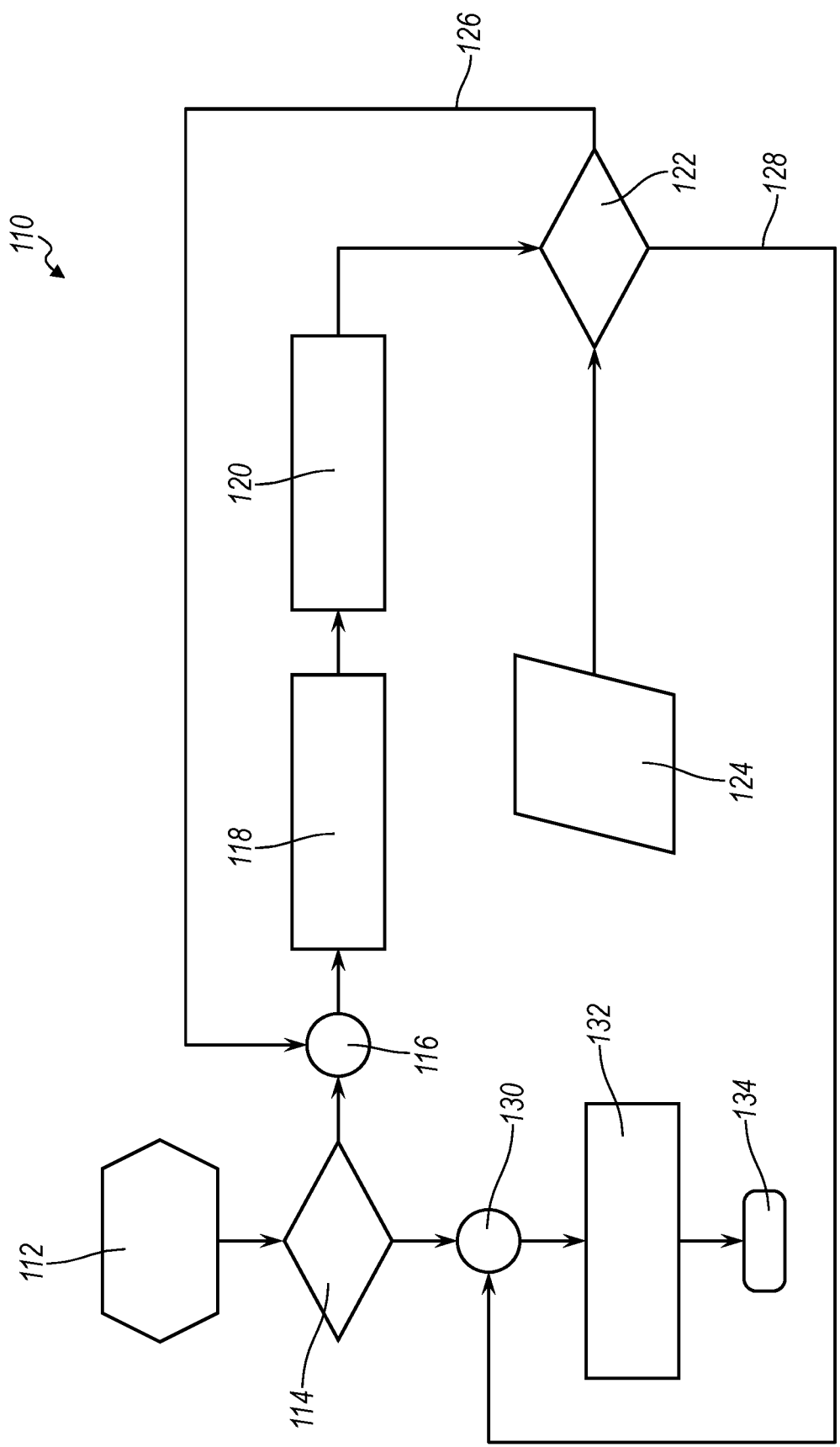
FIG. 3 is a flow diagram for catalytic converter warmup mode using torque reserve as a catalyst light-off exit strategy.
Figure 4:
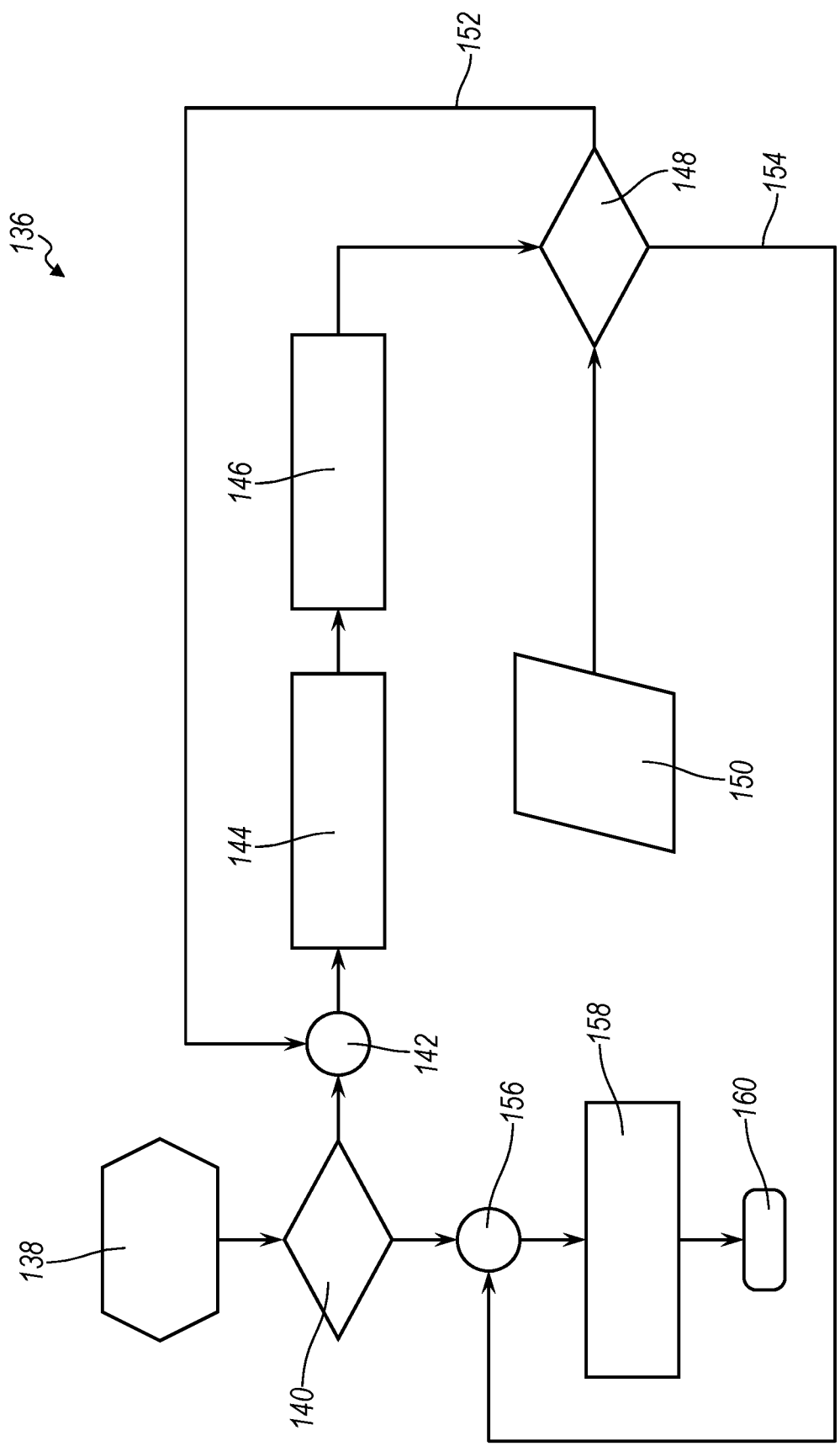
FIG. 4 is flow diagram for catalytic converter warmup mode using exhaust enthalpy as a catalyst light-off exit strategy.

Referring to FIG. 4 and again to FIGS. 1 through 3, according to other aspects, a method for determining exhaust enthalpy integrates a cumulative exhaust enthalpy as a parameter for an exit strategy from catalyst warmup mode. Torque reserve as defined above is applied to increase exhaust temperature. Values of exhaust enthalpy into the catalyst are integrated over time and upon reaching a threshold, the heat energy threshold for catalyst light-off is used as a basis to conclude if the necessary increased exhaust enthalpy has been reached to achieve catalytic light-off.

According to a catalyst exhaust enthalpy integration algorithm 136, a catalytic converter warmup mode status 138 is determined at a determination block 140. If an output 142 from the determination block 140 is positive, indicating the catalytic converter warmup mode is enabled, in a request step 144 a request for torque reserve is made to increase an exhaust temperature. Following the request for torque reserve 144, in a computation block 146 an exhaust enthalpy into the catalyst 54 is computed and integrated. The result from the computation block 146 is entered as a first variable into a comparison block 148. A second variable, defining an energy threshold necessary to achieve catalyst light-off, is obtained from a second computation block 150 and entered into the comparison block 148. As noted above, the energy threshold necessary to achieve catalyst light-off used as the second variable is integrated as an exhaust flow accumulated value. In the comparison block 148, the second variable defining the energy threshold necessary to achieve catalyst light-off is compared to the first variable obtained from the computation block 146 to determine if the second variable is greater than the first variable. If an output 152 from the comparison block 148 is negative, the exhaust enthalpy available is sufficient to meet the energy threshold required for catalyst light-off, and the algorithm returns to and repeats the request step 144.

If an output 154 from the comparison block 148 is positive, the exhaust enthalpy available is insufficient to meet the energy threshold required for catalyst light-off. The algorithm provides a response gate 156 which receives the output 154 from the comparison block 148. In addition, if an output from the determination block 140 is negative, indicating the catalytic converter warmup mode is not enabled, the negative response from the determination block 140 is also forwarded to the response gate 156. Any response received by the negative response gate 156 results in a flag 158 indicating torque reserve should not be requested, and the algorithm ends at a step 160.

A system and method for determining exhaust enthalpy during conditions including transient engine speed and transient engine load of the present disclosure offers several advantages. These include the use of exhaust enthalpy as an input to a diagnostic method as opposed to the use of measurement deviations from a prescribed steady engine operating condition. The present method also provides a generalized strategy for converter warm-up and the ability to diagnose a cold start emissions strategy during off-idle operations. The present method is energy based and can be used in both steady state and transient engine speed and load conditions. The strategy uses exhaust enthalpy which accounts for total heat energy into the catalyst, and applies as a maintenance parameter, and therefore can be applied during all driving conditions. According to several aspects, the present method provides two exit strategies, including a first strategy related to an amount of torque reserve needed to increase exhaust temperature to achieve catalyst light-off, and a second strategy related to a total exhaust enthalpy into the catalyst to achieve catalyst light-off.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for determining catalytic light-off conditions during transient engine speed and transient engine load, comprising:
   a catalytic converter configured to receive exhaust output from an engine;
   at least one exhaust parameter measurement device defined by each of a temperature sensor, a mass air flow sensor, and a mass fuel flow sensor measuring parameters of the exhaust entering the catalytic converter;
   a processor configured to:
      receive output from the at least one exhaust parameter measurement device;
      continuously calculate an enthalpy of the catalytic converter; and
      repeatedly compare the enthalpy of the catalytic converter to a predetermined enthalpy threshold required to achieve catalytic light-off;
   a calculation block of the processor configured to receive inputs including an exhaust input temperature, a mass air flow, a mass fuel flow, and a catalytic converter warmup mode state and calculate the enthalpy of the catalytic converter, the processor calculating a cumulative mass flow defined by the mass fuel flow and the mass air flow past the catalytic converter, the system further including a comparative block of the processor is configured to determine a) whether the calculated enthalpy of the catalytic converter is greater than the predetermined enthalpy threshold, and b) whether the cumulative mass flow is less than a predetermined cumulative mass flow threshold.

2. The system of claim 1, wherein in the calculation block, the catalytic converter warmup mode state being True is determined prior to initiating calculation of the enthalpy of the catalytic converter, the catalytic converter warmup mode state being True identifying the catalytic converter is at a temperature below that required for catalytic light-off.

3. The system of claim 1, wherein the system is configured to generate a diagnostic pass signal if an output from the comparative block for (a) and (b) is affirmative.

4. The system of claim 1, wherein if an output from the comparative block for (a) and (b) is negative, a diagnostic fail signal is generated.

5. The system of claim 1, wherein the system further includes a determination block of the processor wherein it is determined if the catalytic converter warmup mode state is False and if the cumulative mass flow is greater than a predetermined minimum threshold.

6. The system of claim 5, wherein a diagnostic test indeterminate signal is generated if an output from the determination block is positive.

7. The system of claim 1, further including:
   a determination block of the processor configured to determine a catalytic converter warmup mode enabled status, and if an output from the determination block is positive indicating the catalytic converter warmup mode is enabled, issuing a request for a torque reserve to increase an exhaust temperature, the torque reserve computed and integrated following the request for the torque reserve.

8. The system of claim 7, further including:
   a comparison block of the processor configured to receive a result from the computation block as a first variable; and
   a second variable defining an energy threshold necessary to achieve catalyst light-off.

9. The system of claim 8, wherein:
   the energy threshold required to achieve catalyst light-off defining the second variable is integrated as an exhaust flow accumulated value; and
   in the comparison block the second variable is compared to the first variable to determine if the second variable is greater than the first variable, and if an output from the comparison block is negative, the torque reserve is sufficient to meet the enthalpy threshold required for catalyst light-off.

10. A method for determining catalytic light-off conditions of a catalytic converter during transient engine speed and transient engine load, comprising:
   measuring exhaust conditions entering the catalytic converter
   using an exhaust parameter measurement device defined by at least one of a temperature sensor, a mass air flow sensor, and a mass fuel flow sensor;
   forwarding an output from the exhaust parameter measurement device to a processor;
   calculating an enthalpy of the catalytic converter in the processor;
   repeatedly comparing the enthalpy of the catalytic converter to a predetermined enthalpy threshold required to achieve catalytic light-off;
   determining that a catalytic converter warmup mode is enabled; and
   requesting a torque reserve to increase the exhaust temperature.

11. The method of claim 10, further including:
   confirming the catalytic converter is at or below a required temperature for catalytic light-off; and
   performing the calculating step in a calculation block, the calculation block receiving inputs including an exhaust temperature, a mass air flow, a mass fuel flow, and a catalytic converter warmup mode.

12. The method of claim 11, further including determining if the calculated enthalpy of the catalytic converter is greater than the predetermined enthalpy threshold.

13. The method of claim 10, further including:
   identifying a first variable defining an energy threshold necessary to achieve catalyst light-off and entering the first variable into a comparison block;
   entering a result from the computing step into the comparison block of the processor as a second variable; and
   comparing the first variable to the second variable to determine if the second variable is greater than the first variable, and if the comparison is negative, the torque reserve meets an enthalpy threshold required for catalyst light-off.

14. A method for determining catalytic light-off conditions of a catalytic converter during transient engine speed and transient engine load, comprising:
   measuring exhaust conditions entering the catalytic converter using at least one exhaust parameter measurement device defined by at least one of a temperature sensor, a mass air flow sensor, and a mass fuel flow sensor;
   forwarding an output from the at least one exhaust parameter measurement device to a processor;
   continuously calculating an enthalpy of the catalytic converter in the processor;
   repeatedly comparing the calculated enthalpy of the catalytic converter to a predetermined enthalpy threshold required to achieve catalytic light-off;
   calculating a cumulative mass flow past the catalytic converter; and determining if:
  a) the enthalpy of the catalytic converter is greater than the predetermined enthalpy threshold; and
  b) if the cumulative mass flow is less than a predetermined cumulative mass flow threshold.

15. The method of claim 14, further comprising:

requesting a torque reserve to increase an exhaust temperature; and computing and integrating the torque reserve.

\* \* \* \* \*